Figure 1:
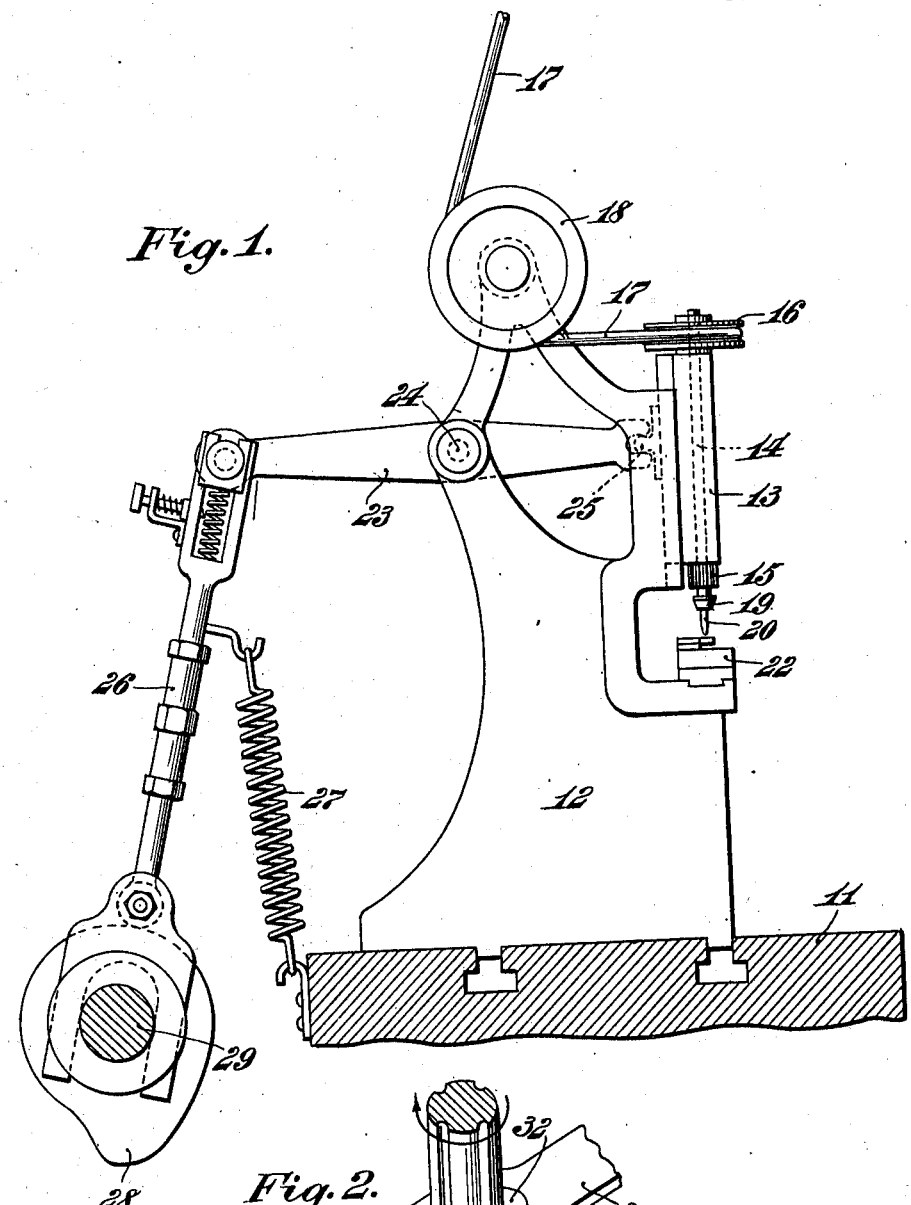

W. FEHR & J. KAUFMANN.
MACHINE FOR MAKING HEDDLES.
APPLICATION FILED SEPT. 26, 1908.

970,808.

Patented Sept. 20, 1910.
4 SHEETS—SHEET 1.

WITNESSES:
Percival K. Reed
Mae Hofmann

INVENTORS
William Fehr, and
Jacob Kaufmann,
BY Jas. C. Wolnsmith
ATTORNEY.

W. FEHR & J. KAUFMANN.
MACHINE FOR MAKING HEDDLES.
APPLICATION FILED SEPT. 26, 1908.
970,808.
Patented Sept. 20, 1910.
4 SHEETS—SHEET 2.
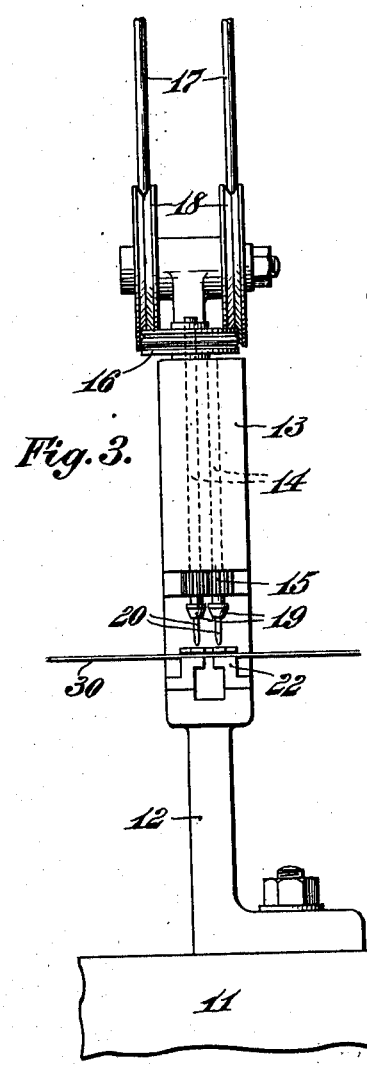
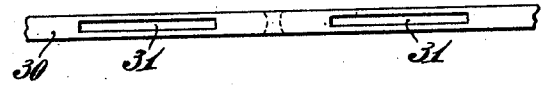
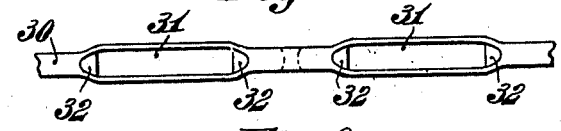
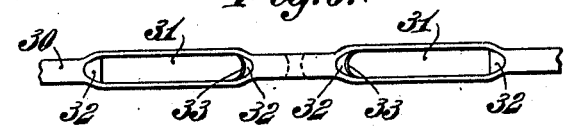
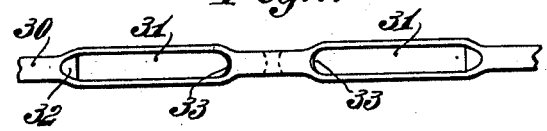
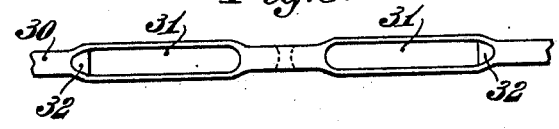
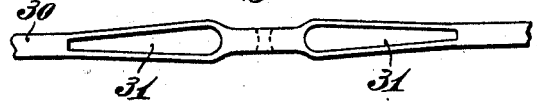
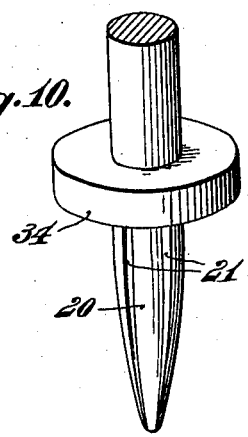
WITNESSES:
INVENTORS
William Fehr, and
Jacob Kaufmann,
BY
Jas. C. Wolmsmith
ATTORNEY.
THE NORRIS PETERS CO., WASHINGTON, D. C.

W. FEHR & J. KAUFMANN.
MACHINE FOR MAKING HEDDLES.
APPLICATION FILED SEPT. 26, 1908.

970,808.

Patented Sept. 20, 1910.
4 SHEETS—SHEET 3.

WITNESSES:
Lillian H. Nereil.
Elizabeth J. Bloomer.

INVENTORS
William Fehr, and
Jacob Kaufmann,
BY Jas. C. Wolvensmith
ATTORNEY.

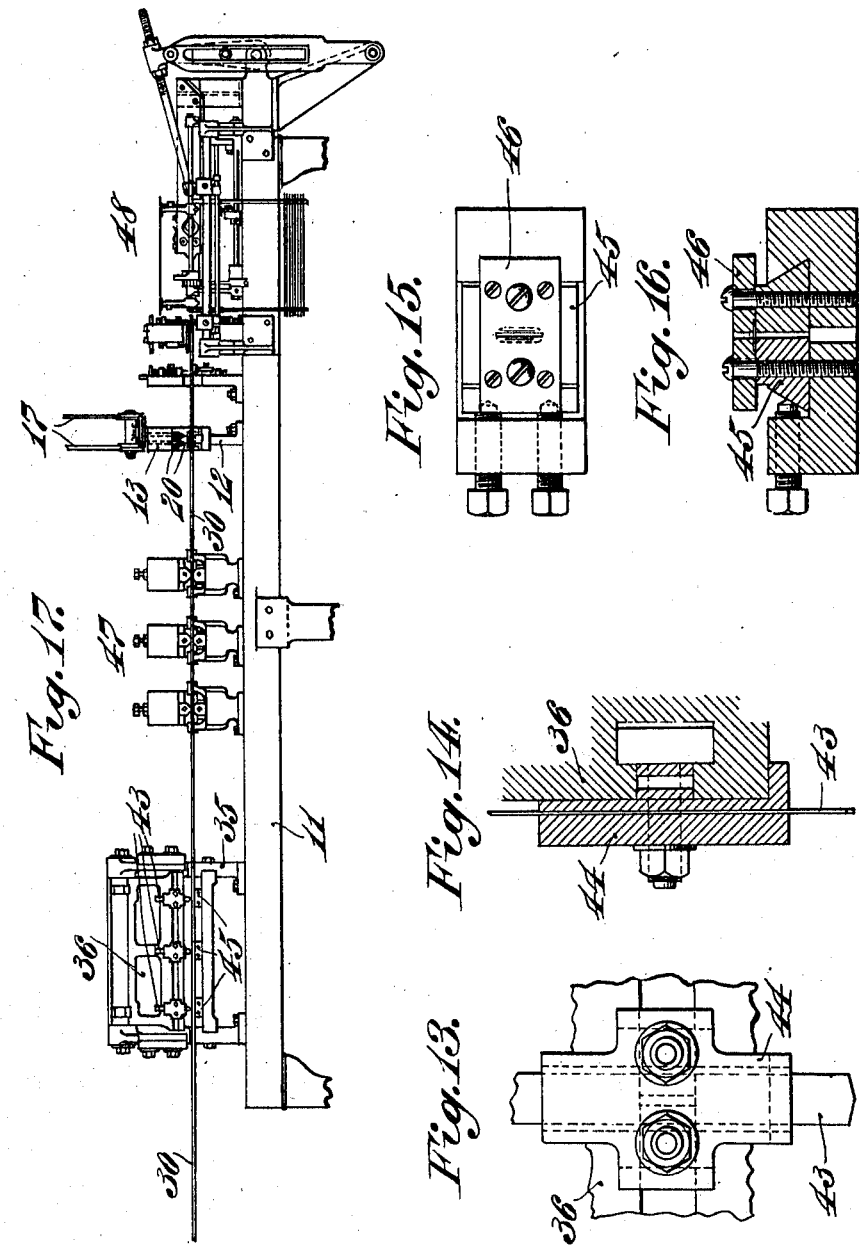

UNITED STATES PATENT OFFICE.

WILLIAM FEHR AND JACOB KAUFMANN, OF PHILADELPHIA, PENNSYLVANIA, ASSIGNORS TO STEEL HEDDLE MANUFACTURING COMPANY, OF PHILADELPHIA, PENNSYLVANIA, A CORPORATION OF PENNSYLVANIA.

MACHINE FOR MAKING HEDDLES.

970,808.  Specification of Letters Patent.  Patented Sept. 20, 1910.

Application filed September 26, 1908. Serial No. 454,931.

*To all whom it may concern:*

Be it known that we, WILLIAM FEHR and JACOB KAUFMANN, both citizens of the United States, residing at Philadelphia, in the county of Philadelphia and State of Pennsylvania, have jointly invented certain new and useful Improvements in Machines for Making Heddles, of which the following is a specification.

Our invention relates to a machine for making heddles and it relates more particularly to a mechanism for use in the formation of the mortises of the heddles.

In United States Letters Patent No. 875,659, granted to William Fehr, on Dec. 31, 1907, there is shown and described a machine for the manufacture of heddles, in which the heddles are formed from a thin narrow strip of metal or wire which is first punched and thereby slitted, at points where the mortises and the eye are to be located, the strip being then swaged to expand the slits laterally and thereby increase the size of the mortises and the eye to the desired width. The present invention is adapted for use in connection with machines of the type described and shown in the aforesaid Letters Patent No. 875,659, and in such connection the present invention provides means for producing heddles, the mortises whereof will have increased bearing surfaces at the point of support on the heddle-frame rods, or if the swaging mechanism of the machine described and shown in Letters Patent No. 875,659 be omitted, then in this instance the mechanism of our present invention may be employed to expand the slits to the desired width instead of employing the swaging mechanism there shown.

To this end the object of our present invention is to provide a mechanism for use in the formation of the mortises of the heddles, which mechanism is adapted for several purposes, as desired, according to the previous manipulation of the strip from which the heddles are made, as will be hereinafter more fully described.

Figure 2:
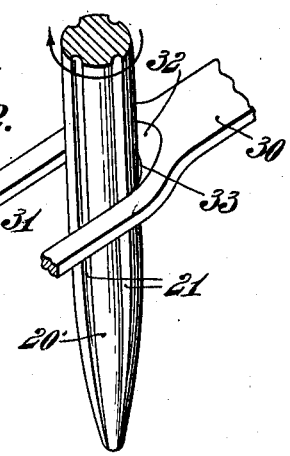
Figure 11:
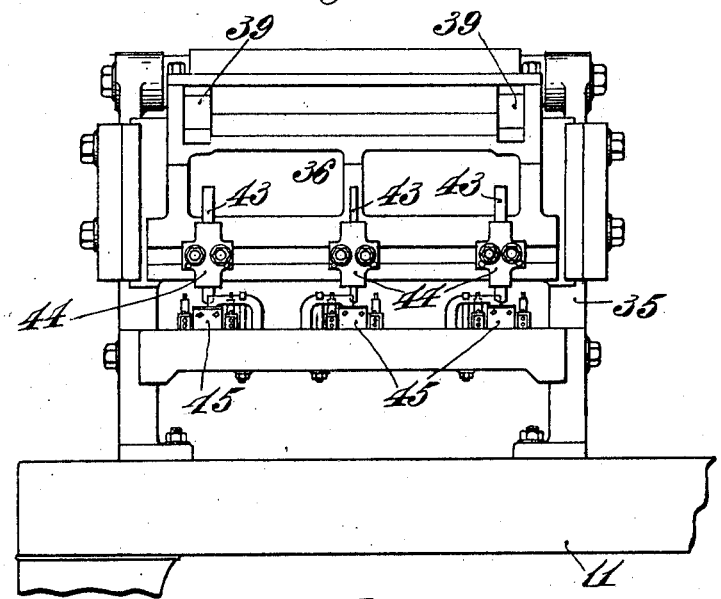
Figure 12:
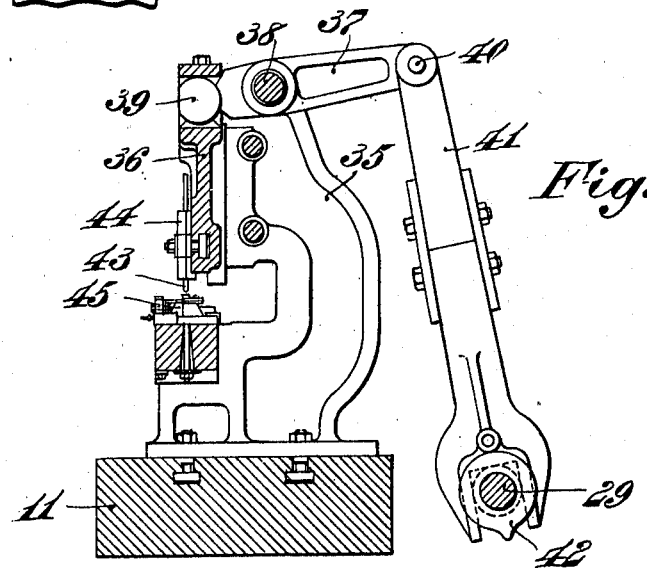

The nature and characteristic features of our invention will be more readily understood from the following description taken in connection with the accompanying drawings forming part hereof, in which, Figure 1 is a side elevation, partly in section, of a machine embodying the main features of our invention, Fig. 2 is a perspective view of a rotating pin, constituting the principal element of our invention, the same being shown in operative engagement with the mortise of a heddle, Fig. 3 is a front elevation of the machine shown in Fig. 1, Figs. 4 to 9 are plan views of a portion of a strip of metal or wire in various stages of the formation of mortises therein, and Fig. 10 is a perspective view of a modified form of rotating pin. Fig. 11 is a front elevation of the mechanism for slotting and piercing the metal strip at the points where the mortises and warp eye are to be located. Fig. 12 is a cross sectional view of the mechanism shown in Fig. 11. Fig. 13 is a detailed view enlarged illustrating in front elevation a punch holder and a punch held in position by the same. Fig. 14 is a cross sectional view of the punch holder shown in Fig. 13. Fig. 15 is a top or plan view of the punch die and stripping plate carried by the same. Fig. 16 is a cross sectional view of the parts shown in Fig. 15, and Fig. 17 is a front elevation of a complete machine for making heddles with the mechanism for operating on the mortises shown in position therein.

Referring to the drawings, 11 is the bed plate of a complete machine for the manufacture of heddles, such for example as shown in the aforesaid Letters Patent No. 875,659. Adjustably secured, with respect to its longitudinal location, on the bed plate 11 is a frame work 12. At the upper front portion of the frame work 12 there is slidably mounted a block 13, so arranged as to have a range vertical movement with respect to the frame work. Journaled in block 13 are two vertical spindles 14, geared together as at 15, and one of which is provided with a pulley 16 which is driven by means of a belt 17 running over idler pulleys 18 to a suitable driving pulley not shown. Spindles 14 are provided at their lower ends with chucks 19 in which are secured the tapered pins 20, which as shown in Fig. 2 may be provided with a series of vertical flutes or corrugations 21. Arranged below the pins 20 and secured to the frame work 12 is an anvil 22 over which the strip of metal passes and periodically rests during the formation of the heddle, anvil 22 forming a support for the strip during the period of rest when the mortise is being acted upon by the pin 20. The block 13 and consequently pins 20 are raised and lowered at predetermined times by means of a lever 23, pivoted at 24 to the frame work 12, one end of the lever 23 engaging a projection 25 carried by block 13, and the other end of the lever being actuated by a connecting rod 26 which in turn is actuated, against the tension of spring 27, by means of a cam 28 mounted on the rotating shaft 29.

The strip 30 of metal or wire is first slitted, as shown at 31 in Fig. 4, by the mechanism provided for that purpose which is shown in Figs. 11 to 16 of the drawings, and which comprises a frame work 35 within which cross head 36 is mounted in such manner as to be vertically reciprocable therein. The mechanism for reciprocating the cross head 36 may consist of a lever 37 pivoted to the frame work 35 as at 38 and having one end in engagement with the cross head 36 as at 39, and having its other end provided with a connecting rod 41 pivotally secured thereto as at 40 which connecting rod is adapted to be periodically actuated by the cam 42 which is mounted on the main shaft 29 of the machine. The cross head 36 carries the punches 43 which are mounted in blocks 44, which blocks 44 are connected to the cross head 36 by a T bolt and slot arrangement whereby the punches may be shifted on said cross head so that various sized heddles may be readily made on the machine. The frame work 35 also carries the die blocks 45, one for each punch 43, which die blocks are each provided with a stripper plate 46 and are so arranged on the frame work 35 as to be readily adjustable to bring them into alinement with their respective punches. The aforesaid mechanism, it will, of course, be understood may be supplanted by other mechanism for the same purpose, namely the slitting of the strip of metal or wire at the proper location to be subsequently operated upon by the mechanism for forming the mortises and the eye.

The slots 31 may be expanded laterally (see Fig. 5) to widen the slots by means of the swaging mechanism shown at 47 in Fig. 17 of the drawings, which mechanism is shown and described in detail in the aforesaid Letters Patent No. 875,659, but of course, other suitable mechanism may be employed for accomplishing the same result. Where the swaging mechanism is employed for widening the slots 31, the mortises will have fins or ribs 32 of compressed metal at the ends of the mortises which fins being very thin at their bearing portions may cause the heddles to stick on the heddle frame rods at improper points. To obviate this difficulty the mortises are subjected to the manipulation of the mechanism forming the main part of the present invention, the operation of which is as follows: In the operation of the complete machine for the manufacture of the heddles the strip 30 is intermittently fed and stopped during the formation of the heddles by the mechanism shown at 48 in Fig. 17 of the drawings which mechanism is fully described and shown in detail in the aforesaid Letters Patent No. 875,659. The frame work 12 is arranged on the bed plate 11 of the complete machine at such position that the ends of slits 31 of the adjoining ends of successive heddles will be brought under the pins 20 during the period of rest of the strip 30, the position of the pins 20 being such that as they are lowered by means of the cam 28, connecting rod 26, and lever 23, the rotating pins 20 will encounter the margins of the fins or ribs 32 and curl or upset the metal of these fins, forming lateral projections 33 at what will be the outer or bearing portions of the mortises 31, and thereby providing the heddles with increased bearing surfaces to the end that they will not stick on the heddle-frame rods when in use.

By differences in the previous manipulation of the strip, the machine of our present invention may be employed for producing heddles having slightly different characteristics. For example, in Fig. 7 there is shown a form of mortise in which the fins or ribs are either omitted or cut away and the lateral projections 33 are formed to project or extend directly from the side faces of the heddle proper, instead of from the side faces of the fins, as is the case in Fig. 6. By properly gaging the length of the slits 31 shown in Fig. 4, the pins 20 may be used in lieu of a swaging operation to expand the slits, and, if desired, without forming any lateral projections, as shown in Figs. 8 and 9. In the form shown in Fig. 8 the inner end of the mortise has been expanded by swaging, while the outer or bearing end of the mortise has been expanded solely by the action of the rotating pin 20. In the form shown in Fig. 9 the inner end of the mortise has not been expanded at all, in this case only the outer or bearing end has been expanded by means of the rotating pin 20, resulting in the formation of a mortise of tapered outline. In the instances where the pins 20 are used to expand the mortises at points where no previous swaging has been done to expand the slits, it is preferable when the heddles are made from hard steel wire, that the strip be annealed at these points to prevent breaking during the operation. To prevent the shanks of the mortises from being displaced out of the proper planes when mortises of the forms shown in Figs. 8 and 9 are made, the pin 20 is provided with a collar 34 as shown in Fig. 10, the collar 34 being adapted to bear against the adjoining portions of the strip to flatten them in the event of their being displaced.

Having thus described the nature and characteristic features of our invention, what we claim as new and desire to secure by Letters Patent is:

1. In a machine of the character described, the combination with means for slitting a strip of metal, of a support for the strip, a rotating pin, and means for inserting said pin into the slit in the strip of metal in a direction transverse to the plane of the strip of metal.

2. In a machine of the character described, the combination with means for slitting a strip of metal, of a support for the strip, a rotating pin, said pin having its free end tapered, and means for inserting said pin into the slit in the strip of metal in a direction transverse to the plane of the strip of metal.

3. In a machine of the character described, the combination with means for slitting a strip of metal, of a support for the strip, a rotating pin, said pin having a series of longitudinal flutes or corrugations, and means for inserting said pin into a slit in the strip of metal in a direction transverse to the plane of the strip of metal.

4. In a machine of the character described, the combination with means for slitting a strip of metal, of a support for the strip, a rotating pin, a collar mounted on said pin, and means for inserting said pin into the slit in the strip of metal in a direction transverse to the plane of the strip of metal.

In testimony whereof we have hereunto signed our names in the presence of two witnesses.

WILLIAM FEHR.
JACOB KAUFMANN.

Witnesses:
JAS. C. WOBENSMITH,
PERCIVAL K. REED.